Patented Feb. 9, 1943

2,310,799

UNITED STATES PATENT OFFICE 2,310,799

PEST CONTROL COMPOSITION

John Frank Lontz, Wilmington, Del., assignor to E. I. du Pont de Nemours & Company, Wilmington, Del., a corporation of Delaware No Drawing. Application August 5, 1941,
Serial No. 405,555

7 Claims. (Cl. 167—22)

This invention relates to pest control compositions useful as bactericides, fungicides, insecticides, and disinfectants.

This invention has for its general object the provision of new and useful compositions having the power of killing or repelling economically or physiologically harmful pests, such as bacteria, fungi, insects, and the like which prey on plant and animal matter either in its animate, inanimate, or fabricated state. A further object of this invention is the provision of pest control compositions, especially bactericidal compositions, having a high degree of effectiveness in the presence of tissue fluids such as blood serum. Other objects will appear hereinafter.

These objects are accomplished by the following invention of pesticidal compositions comprising as an essential active ingredient a linear polymeric amidine salt. These polymeric materials are defined as salts of linear polymers containing as integral members of the chain a multiplicity of recurring groups consisting of a trivalent nitrogen atom having one valence attached to hydrogen or to an alkyl group of 1–5 carbon atoms, and a second valence attached to a chain carbon atom which in turn is connected by a double bond to a hydrogen bearing imino group, these recurring groups being connected by divalent organic radicals having terminal valences stemming from carbon, and which are free from groups reactive with amidine salt groupings. Preferably the recurring group, as defined above, is separated by a chain of at least four linear atoms.

The great majority of these polymeric salts may be represented by the following formulae:

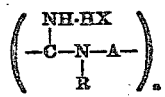

or

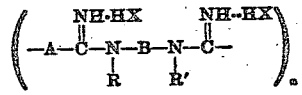

where A and B are divalent organic radicals having their free valences stemming from carbon and are free from groups reactive with amidine salt groups; R and R' are hydrogen or alkyl radicals of from 1–5 carbon atoms, X is the anion of an acid, and $n$ is the number of polymer units in the chain. Preferably, A and B are hydrocarbon, R and R' are hydrogen and X is an anion of a strong acid having an ionization constant of at least $10^{-5}$. More preferably, X is a halogen of atomic weight between 35 and 126 and is more preferably chlorine. In a further preferred modification A and B are hydrocarbon groups with at least 4 carbon atoms in the chain.

The linear polymeric amidine salts can be prepared according to the processes described in Hunt and Kirby, application Serial No. 350,108. The salts are characterized in general by hygroscopicity and water solubility and are for the most part white powdery materials.

These polymeric salts are highly effective bactericides, in many instances being effective in aqueous solutions in dilutions of 1 to 20,000 to 1 to 50,000 against *Staphylococcus aureus*. The linear polymeric amidine salts of this invention have a definite fungicidal effect and also an insecticidal activity, for example, against clothes moths and Mexican bean beetles.

The bactericidal properties of the linear polymeric amidine salts vary with the individual members of this class. Those which have been found outstanding are those prepared from aliphatic polymethylene primary diamines containing 6 or more carbons in the methylene chain, e. g., hexamethylenediamine and decamethylenediamine, and the diiminoether dihydrochlorides from polymethylene dinitriles containing 6 or more carbon atoms in the chain, e. g., adipodinitrile and sebacodinitrile.

The polymeric salts with which this invention is concerned were tested for bactericidal action according to the standard F. D. A. (Food and Drug Administration) method. Their bacteriostatic activity, i. e., their efficiency for inhibiting bacterial growth, was also determined by methods well known in bacteriology.

The more detailed practice of the invention is illustrated by the following examples, wherein parts are given by weight. They illustrate the preparation and application of certain polymeric amidine salts to bactericidal, fungicidal and insecticidal uses. These examples are illustrative and not limiting.

The term "serum" as used in describing the bacteriological tests refers to horse blood serum. The term "whole blood" refers to citrated human blood.

EXAMPLE 1. — *Polymeric hexamethyleneadipodiamidine dihydrochloride*

A suspension of 2.73 parts of diethyl adipodiimidate dihydrochloride (adiponitrile diethyl diiminoether dihydrochloride)

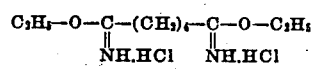

in 3 parts of absolute ethanol is cooled to 0° C. and mixed with shaking and cooling, with a solution of 1.16 parts of hexamethylenediamine in 7 parts of absolute ethanol and cooled to 0° C. The mixture is then allowed to stand 48 hours at 25° C. The ethanol is removed by evaporation in vacuo and this residue is then washed with dry ether and dried in vacuo. A white hygroscopic solid results which is soluble in ethanol and in water. The yield is practically quantitative.

This product when tested for bacterial activity by the standard F. D. A. method against *Staphylococcus aureus* at 37° C. showed a killing dilution of 1 to 20,000 in 10 minutes in the absence of serum. A similar test carried out in the presence of 10% serum showed a killing dilution of 1 to 30,000 in 15 minutes. When tested in the presence of whole blood, this product had a killing dilution of 1 to 1,000 in 30 minutes. The minimum lethal dose of the compound was found to be 45 mg. per kg. when injected subcutaneously in mice.

EXAMPLE 2. — *Polymeric decamethylenesebacodiamidine dihydrochloride*

To a suspension of 30.1 parts of sebaconitrile dimethyl diiminoether dihydrochloride in 200 parts of dry methanol cooled to 0° C. is added with shaking 17.2 parts of decamethylenediamine in 25 parts of dry methanol cooled to 0° C. The mixture is then allowed to stand 48 hours at 25° C. The methanol is removed by evaporation in vacuo and the residue is washed with dry ether and dried in vacuo. A white hygroscopic solid, which is soluble in methanol, ethanol and in water, results in almost quantitative yield.

This product was tested according to the F. D. A. method against *Staphylococcus aureus* at 37° C. in water, serum, and whole blood. The results are given in the following table.

*Table A*

| Organism | Medium | Killing dilution in parts | | |
|---|---|---|---|---|
| | | 5 min. | 10 min. | 15 min. |
| Staphylococcus aureus. | Water | 1-10,000 | 1-20,000 | 1-30,000 |
| Do | 10% serum | 1-10,000 | 1-20,000 | 1-20,000 |
| Do | 10% whole blood. | 1-5,000 | 1-5,000 | 1-5,000 |

Thus, the linear polymeric amidine salt of this example as prepared above has a good bactericidal potency against *Staphylococcus aureus* and its effectiveness against *Staphylococcus aureus* is not appreciably lowered by the addition of 10% serum to the culture medium.

Polymeric decamethylenesebacodiamidine dihydrochloride was also tested against other organisms. The results are shown in the following table.

*Table B*

| Organism | Test media | Killing dilution in parts | | |
|---|---|---|---|---|
| | | 5 min. | 10 min. | 15 min. |
| B. coli | Water | 1-30,000 | 1-30,000 | 1-30,000 |
| B. typhosus | do | 1-75,000 | 1-100,000 | 1-100,000 |
| Streptococcus hemolyticus. | do | 1-50,000 | 1-100,000 | 1-100,000 |

Polymeric decamethylenesebacodiamidine dihydrochloride has a high inhibiting action on the growth of bacteria. Tests were made by a standard method for determining bacteriostatic potency, which consists in adding to broth a given amount of the test compound followed by inoculation of the broth with *Staphylococcus aureus* organisms. The growth of the bacteria is then observed for a period of five days. The highest dilution at which no growth takes place is considered as the maximum effective bacteriostatic dilution. Ten cc. of broth containing the polymeric amidine salt in the dilution indicated was inoculated with *Staphylococcus aureus*. The results, after maintaining the solution at 37° C. for 2 and 5 days respectively, are indicated in Table C as the dilution necessary to completely inhibit growth. In certain instances 10% blood was added to the broth.

*Table C*

| Organism | Type of broth | Dilution and time of contact |
|---|---|---|
| Staphylococcus aureus | Plain | 1,000,000/2 days. 650,000/5 days. |
| Do | 10% blood | 1,000,000/2 days. 500,000/5 days. |
| B. coli | Plain | 650,000/2 days. 650,000/5 days. |
| B. typhosus | do | 1,000,000/2 days. 650,000/5 days. |
| Streptococcus hemolyticus | do | 2,500,000/2 days. 1,000,000/5 days. |
| Do | 10% blood | 2,500,000/2 days. 2,500,000/5 days. |

The bacteriostatic effectiveness of the compound of this example against *Staphylococcus aureus* was also tested by the agar cup plate method which test indicates the penetrating power of the antiseptic agent. The chemical as a dilute water solution is placed in a small depression in agar containing the organism in a plate. The diameter of the area of growth inhibition of the organism is then measured in millimeters. The results of these tests are included in Table D.

*Table D*

| Culture plate | Zone of growth inhibition in mm. at various dilutions | | | |
|---|---|---|---|---|
| | 1-100 | 1-1,000 | 1-5,000 | 1-10,000 |
| Plain agar | 5.0 | 3.0 | 2.0 | 1.0 |
| 10% horse serum | 4.5 | 3.0 | 1.0 | 1.0 |
| 10% human blood | 5.0 | 3.0 | 2.0 | 1.0 |
| 50% human blood | 6.0 | 3.0 | 2.0 | 1.0 |

The minimum lethal dose of this compound when injected intro-peritoneally into mice was 25 mg. per kg.

EXAMPLE 3.—*Polymeric dodecamethylenedodecanodiamidine dihydrochloride*

A suspension of 32.9 parts of dimethyl dodecanodiimidate dihydrochloride (dodecanodinitrile dimethyl diiminoether dihydrochloride) in 200 parts of dry methanol is cooled to 0° C. and mixed with a solution of 20.0 parts of dodecamethylenediamine in 35 parts of methanol cooled to 0° C. The mixture is allowed to stand 48 hours at 25° C. and is then concentrated to dryness in vacuo. The solid product is washed with dry ether and dried in vacuo. A white, slightly hydroscopic powder results. This product is obtained in quantitative yields and is soluble in water and in ethyl alcohol.

When tested according to the F. D. A. method against *Staphylococcus aureus* at 37° C. this product showed a bactericidal dilution of 1 to 50,000 in 15 minutes in the absence of serum. In the presence of 10% serum the bactericidal dilution was 1 to 20,000 in 15 minutes. In the presence of whole blood this compound was bactericidal toward *Staphylococcus aureus* at dilutions of 1 to 5,000 in 30 minutes. This product also showed bacteriostatic activity at dilutions of 1 to 600,000 when tested in broth by the standard method over a period of 5 days at 37° C.

The minimum lethal dose of this compound when injected intraperitoneally in mice was 20 mg. per kg.

EXAMPLE 4.—*Polymeric p-phenylenediethylenesebacodiamidine dihydrochloride*

A suspension of 30.1 parts of dimethyl sebacodiimidate dihydrochloride (sebaconitrile dimethyl diiminoether dihydrochloride) was mixed with a solution of 11.6 parts of p-bis(beta-aminoethyl) benzene in 20 parts of methanol. The mixture was allowed to stand 48 hours at room temperature and was then concentrated to dryness in vacuo. The residue was washed with dry ether and dried in vacuo. The product was a white, water-soluble powder. The yield was quantitative.

When tested according to the F. D. A. method this product had a very good bactericidal activity against *Staphylococcus aureus*. In the absence of serum in a dilution of 1 to 50,000 killing was effected in 15 minutes. In the presence of 10% serum the bactericidal dilution was 1 to 20,000 in 15 minutes. The product showed bacteriostatic activity in broth at a dilution of 1 to 40,000 over a time of contact of 5 days.

Table E below summarizes the bactericidal and bacteriostatic properties of a group of polymeric amidine salts. These compounds were all prepared according to the methods outline in the previous examples which are further described in Hunt and Kirby application Serial Number 350,108. These compounds were all tested by the standard F. D. A. method for bactericidal activity against *Staphylococcus aureus*. Their effective bacteriostatic solution was also determined by the method described in Example 2 which is a standard method in bacteriology.

*Table E*

| Compound | Bactericidal dilution (15 minutes) | Bactericidal dilution in 10% blood serum (15 minutes) | Bactericidal dilution in 10% whole blood (30 minutes) | Effective bacteriostatic dilution | Toxicity in mg./kg. in mice intraperitoneally |
|---|---|---|---|---|---|
| Polymeric hexamethylenedodecanodiamidine dihydrochloride | 1:30,000 | 1:20,000 | 1:2000 | 1:25,000 | 35 |
| Polymeric p-(phenylenediethylene) dodecanodiamidine dihydrochloride | 1:20,000 | 1:10,000 | 1:2000 | 1:100,000 | 15 |
| Polymeric hexamethylenesebacodiamidine dihydrochloride | 1:2000 | 1:5000 | 1:500 | 1:250,000 | 15 |
| Polymeric dodecamethyleneadipodiamidine dihydrochloride | 1:30,000 | 1:20,000 | 1:2000 | 1:500,000 | 35 |
| Polymeric tetramethyleneadipodiamidine dihydrochloride | 1:20,000 | 1:20,000 | | 1:100,000 | 20 |
| Polymeric decamethyleneadipodiamidine dihydrochloride | 1:20,000 | 1:10,000 | 1:500 | 1:150,000 | 30 |
| Polymeric p-(phenylenediethylene)-p-phenylenediacetamidine dihydrochloride | 1:10 000 | 1:10,000 | | 1:100,000 | 15 |
| Polymeric decamethylene p-phenylenediacetamidine dihydrochloride | ¹ 1:10,000 | ¹ 1:20,000 | 1:5000 | 1:400,000 | 25 |
| Polymeric p-oxydiphenylenesebacodiamidine dihydrochloride | 1:10,000 | 1:5000 | 1:1000 | 1:500,000 | |
| Polymeric p-oxydiphenyleneadipodiamidine dihydrochloride | 1:5,000 | | 1:500 | 1:200,000 | 35 |
| Polymeric p-methylenediphenyleneadipodiamidine dihydrochloride | 1:10,000 | 1:10,000 | 1:2000 | 1:100,000 | 40 |
| Polymeric dioxytriethylenesebacodiamidine dihydrochloride | 1:10,000 | 1:5000 | 1:2000 | 1:20,000 | 20 |

¹ 10 minutes.

The results in the table show that polymeric linear primary amidine salts in general have bactericidal properties which are diminished only slightly if at all in the presence of blood serum. They maintain a portion of their bactericidal activity even in the presence of whole blood.

The polymeric linear primary amidine salts have been found to be effective against pathogenic molds. The following example shows the activity of a compound of this invention toward *Trichophyton*.

EXAMPLE 5

Polymeric decamethylenesebacodiamidine dihydrochloride when tested by the standard F. D. A. method showed a killing dilution for *Trichophyton* of 1 to 30,000 in 5 minutes and 1 to 50,000 in 10 minutes.

The linear polymeric primary amidine salts of the present invention have also been found to be useful in controlling and checking the development of common fungi in addition to the pathogenic molds as described in the foregoing example. This fungicidal activity has been demonstrated by means of standard tests utilizing the agar plate method. This consists of dispersing the polymeric linear amidine salts in a nutrient agar favorable to the growth of such fungi as *Aspergillus niger* (common black mold). The liquid agar containing the polymeric amidine compound is then poured into sterile Petri plates and when cooled is inoculated with the spores or bits of mycelium of the test fungi. The effective concentration is then determined from a series of test plates containing varying concentration ranges of the compound and is represented by that concentration completely inhibiting all growth of the fungus mycelium and spore germination upon examination 6 days following the inoculation.

The effectiveness of the polymeric linear amidine salts as mold inhibitors is shown by Table F below in which the figures show the dilution effective in completely inhibiting the growth of the indicated fungi when tested in the manner indicated above.

Table F

| Name of compound | Organism | |
|---|---|---|
| | Lumber mold | Aspergillus niger |
| Polymeric decamethylenesebacodiamidine dihydrochloride | 1–250 | 1–1000 |
| Polymeric dodecamethylenedodecanodiamidine dihydrochloride | 1–1000 | 1–1000 |
| Polymeric p-phenylenediethylenesebacodiamidine dihydrochloride | 1–1000 | 1–1000 |
| Polymeric p-methylenediphenyleneadipodiamidine dihydrochloride | 1–1000 | 1–1000 |

The lumber mold indicated in the table is a mixture of several species of mold which infest cut lumber.

In addition to the marked bactericidal and fungicidal activity the polymeric amidine salts with which this invention is concerned also posses insecticidal activity. For insecticidal purposes the polymeric amidine salts may be applied in any one of the usual methods such as, for example, by spraying solutions or appropriately prepared suspensions thereof in water. They may be used alone or mixed with other insecticidal materials such as rotenone or with inert materials such as talc and clay, or other diluents which would serve to improve their spreading or adherence. A suitable composition for use against insects is illustrated by the following examples which demonstrate the efficiency of this class of compounds as stomach insecticides.

EXAMPLE 6

A 5% talc dust of the polymeric hexamethyleneadipodiamidine dihydrochloride is prepared by milling appropriately weighed quantities of the polymeric salt with talc. This dust is sprayed on the foliage of the green bean plant which is then exposed to a known number of Mexican bean beetle larvae. By this spraying treatment 70% of the larvae are destroyed within 5 days with no damage to the foliage.

These polymeric amidine salts are easily incorporated in materials to be protected against insect attack by simply immersing the goods in an aqueous solution of the compound. They are especially useful on woolen articles and are thus very desirable as mothproofing agents. The following example illustrates the mothproofing activity of these compounds.

EXAMPLE 7

Mothproofing tests were carried out using circular pieces of wool fabric 1¼" in diameter. The cloth was soaked in a 2% aqueous solution of the test compound, wrung out and dried and then placed in a small container with ten moth larvae for two weeks. At the end of this time, the number of larvae alive and the percent damage to the cloth was determined. The results of these tests are shown on the following table:

| Name of compound | Larvae killed | Damage to fabric |
|---|---|---|
| | Per cent | Per cent |
| Polymeric hexamethyleneadipodiamidine dihydrochloride | 100 | 8 |
| Polymeric decamethylenesebacodiamidine dihydrochloride | 15 | 13 |
| Polymeric dodecamethylenedodecanodiamidine dihydrochloride | 10 | 18 |
| Polymeric p-phenylenediethylenesebacodiamidine dihydrochloride | 100 | 1 |

Check tests with unimpregnated pieces of fabric showed damage to the goods amounting to 70 to 90%.

In the foregoing examples the use as pesticides of certain specific linear polymeric amidine salts is described. The invention is not limited to the use of these particular compounds since any linear polymeric amidine salt can be effectively used. The polymeric amidine salts are characterized by the presence of a multiply recurring unit consisting of an amidine salt grouping which is an integral part of the chain and which is linked to organic radicals through carbon. Classed as linear polymeric amidine salts are a large variety of compounds. For example, these compounds can be prepared by the reaction of any diiminoether salt which has at least 4 chain atoms between the carbon atoms carrying the nitrogen atoms of the iminoether group, with any organic compound having 2 hydrogen bearing aminonitrogen atoms separated by a chain of at least 4 atoms, the valences of the nitrogen not attached to the chain or to hydrogen being satisfied by alkyl radicals of from 1 to 5 carbon atoms.

The diiminoethers which may be employed may be formulated as

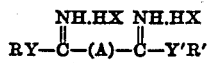

wherein X is the anion of a strong acid, i. e., having an ionization constant of at least $10^{-5}$, preferably a halogen of atomic weight between 35 and 126, and preferably chlorine. R and R' are aliphatic radicals, Y and Y' are oxygen or sulfur and the bivalent radical A separating the iminoether groups is any bivalent organic radical free from groups reactive with diamines and free of groups reactive with the diiminoether group. The bivalent organic radical A may be aliphatic, aromatic, cyclic, or acyclic, homocyclic or heterocyclic, saturated or unsaturated and may be substituted or unsubstituted with groups which do not react with diamines under the conditions of the polymerization reaction, e. g., they may be ethers, sulfides, ketones, amides, and the like. The preferred iminoether salts are those prepared from aliphatic dinitriles having the formula

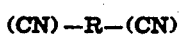

wherein R is an aliphatic radical, and particularly those wherein R is a polymethylene chain having 4–12 carbon atoms. Specific suitable diiminoether salts include the diiminoether salts of the following dinitriles: adiponitrile, pimelonitrile, suberonitrile, azelonitrile, sebaconitrile, dodecanodinitrile, terephthalonitrile, 1,8-naphthonitrile, hexahydroterephthalonitrile, beta-phenyladiponitrile, beta-phenyladiponitrile, 4-ketopimelonitrile, 1,9-dicyano-5-nonanone, p-phenylenediacetonitrile, meta-phenylenediacetonitrile, N-(beta-cyanoethyl)-cyanoacetamide, 1,4-dicyanobutene-2, 2,6-dicyanoquinoline, 3,5-dicyanopyridine, beta, beta'-dicyanodiethylether, and beta, beta'-dicyanodiethyl-sulfide.

The iminoether salt may be prepared from such nitriles, hydrogen chloride or bromide and any alcohol. For convenience of preparation a lower alkanol, e. g., methanol, ethanol, isopropanol, or butanol, is usually used as these alcohols are readily available. A mixture of two or more iminoether salts may be employed.

The diamines which may be employed may be formulated as RHNBNHR' in which R and R' are hydrogen or alkyl groups of from one to five carbon atoms, preferably hydrogen. The diamine may contain both a primary and a secondary amino group, for example, N-methylhexamethylenediamine. B may be any divalent organic radical having at least 4 atoms in a chain between the two hydrogen-bearing nitrogen atoms and free from groups, other than the two amino groups, reactive with the iminoether groups. B obviously contains no groups reactive with hydrogen-containing amino groups. B, subject to these limitations, may be aliphatic, aromatic, cyclic or acylic, homocyclic or heterocyclic, saturated or unsaturated, unsubstituted or substituted with groups which do not react with the diamine or iminoether salt under the conditions of the polymerization reaction. B is preferably hydrocarbon and more preferably a polymethylene group of from six to twenty carbon atoms.

Specific suitable diamines include the following: tetramethylenediamine, pentamethylenediamine, hexamethylenediamine, heptamethylenediamine, octamethylenediamine, nonamethylenediamine, decamethylenediamine, undecamethylene, dodecamethylenediamine, tetradecamethylenediamine, 1,4-diaminocyclohexane, p-xylylenediamine, p-phenylenediamine, p-bis-(beta-aminoethyl)benzene, 1,4-diaminonaphthalene, p,p'-diaminodiphenyl ether, p,p'-diaminodiphenylmethane, p,p'-diaminodiphenyl sulfide, p,p'-diaminodiphenyl sulfoxide, p,p'-diaminodiphenyl sulfone, 1,4-diaminoanthraquinone, N-methylhexamethylenediamine, N-methyldecamethylenediamine, N,N'-dimethylhexamethylenediamine, N,N'-dimethyldecamethylenediamine, 4,4'-diaminotriphenylmethane, mono-beta-alanylethylenediamine, monoglycyltriglycoldiamine

and 2,5-diaminoethylbutadiene cyclic sulfone.

The preferred diamines are aliphatic primary diamines. More than one diamine and/or more than one iminoether salt may be used in the reaction to give a polymeric product.

While the reactants are generally employed in chemically equivalent amounts, it is permissible to depart somewhat from this ratio of reactants without going beyond the scope of compounds which are useful in this invention. The use of an excess, even up to 20%, over the chemical equivalents of either ingredient, may sometimes be employed.

In the preparation of the linear polymeric amidine salts from diiminoethers and diamines, monofunctional reagents, for example, monoamines and monoiminoethers, can be used in limited amounts to control the molecular weight of the polymers by forming end groups on the chain.

The compounds useful in this invention include polymeric amidines having a plurality of

groups in the chain and prepared as above described from iminoether salts of polynitriles including trinitriles and the like and polyamines having a plurality of hydrogen-bearing aminonitrogen atoms including triamines, for example, bis(ω-aminohexyl) amine.

The polymeric amidine salts may contain in the chain aromatic, heterocyclic, and aliphatic including alicyclic groups. The polymeric chain may be hydrocarbon with the exception of the recurring amidine salt groups or it may be interrupted with groups such as ether, thioether, tertiary amino, carbonamido, sulfone and the like. It may be substituted with halogen, nitro, hydroxy, mercapto, carboalkoxy, and any other group unreactive in the amidine formation reaction. In the preferred compounds the amidine salt groups in which the salt is the hydrochloride, for example,

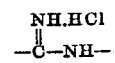

are separated by aliphatic hydrocarbons, preferably polymethylene chains of at least 4 carbon atoms. Compounds of very high bactericidal action are obtained when the length of the hydrocarbon radical separating the amidine groups is from 8 to 12 carbon atoms. The presence of aromatic groups within the hydrocarbon chain of the polymer also yields compounds of good bactericidal action. Although these compounds may exist in a tautomeric form as illustrated by the following formulas:

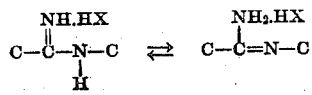

where X is the anion of an acid as previously defined, and these compounds have been described as containing the imino group,

as a lateral substituent in the polymeric chain, it is intended that the claims cover both forms.

In using the polymeric linear amidine salts for the destruction or control of one or more types of pests and organisms that commonly infest plant or animal matter, these products may be dispersed in any suitable medium such as non-solvent liquids, admixed with suitable carriers such as talc or diatomaceous earth, and dissolved in solvents. When so dispersed, admixed or dissolved, they may be used for dusting, spraying or application to plant foliage, impregnating fibrous materials, disinfecting materials subject to attack of microorganisms, and in many similar environments where insecticides, fungicides, bactericides, and disinfectants are commonly employed. In many applications it may be desirable to include suitable spreading and dispersing agents, suitable adhesives, sticking agents and fixatives and other materials useful in promoting the effectiveness for the particular purpose in mind. Likewise, they may be used in combination with other toxic materials whenever required to obtain maximum effectiveness in the simultaneous control of one or more of several pests. For example, these compounds may be admixed with mercurial germicides, e. g., 4-nitro-anhydrohydroxymercuri-ortho-cresol, or the compounds may be used with phenol, the alkyl resorcinols, or the polymeric onium compounds, for example, polymeric quaternary ammonium salts which are also effective bactericides.

The pest control compositions herein described are used chiefly in aqueous or alcoholic solutions although they can also be used in organic solvent solutions or as dusts if so desired. They can be used as general purpose disinfectants such as household disinfectants and as germicides in soaps, cosmetics, antiseptics, mouth washes, kennel sprays, etc. They can also be used for sterilizing surgical instruments and for rendering animate and inanimate objects, e. g., of leather, glue, or wood, lumber, paper, cellulosic products, etc., germ-free due to their bactericidal action. These compositions have particular value in that they lose relatively little of their bactericidal activity in the presence of blood serum and are even active in the presence of blood. These compounds can be used to great effectiveness against the organisms which affect the mucous membranes of animals or human beings such as the cocci, and such varied organisms as *B. coli*, *B. typhosus* and the like. They may also be used in the sterilization of sutures, bandages, milk containers, glassware, cans, bottles, and the like.

The above description and examples are intended to be illustrative only. Any modification of or variation therefrom which conforms to the spirit of the invention is intended to be included within the scope of the claims.

What is claimed is:

1. A pest control composition useful for controlling economically harmful lower forms of life, including bacteria, fungi and insects, containing as an active ingredient a salt of a linear polymeric amidine having as integral chain members recurring bivalent groups consisting of a trivalent nitrogen having one valence attached to a member of the class consisting of hydrogen and alkyl groups of from one to five carbon atoms and a second valence attached to a chain carbon which is in turn attached by a double bond to a hydrogen-bearing imino group, said recurring bivalent groups being connected by divalent organic radicals having their valences stemming from carbon which organic radicals are free from groups reactive with amidine salt groups.

2. A pest control composition useful for controlling economically harmful lower forms of life, including bacteria, fungi and insects, containing as an active ingredient a salt of a linear polymeric amidine having as integral chain members recurring bivalent groups consisting of a trivalent nitrogen having one valence attached to a member of the class consisting of hydrogen and alkyl groups of from one to five carbon atoms and a second valence attached to a chain carbon which is in turn attached by a double bond to a hydrogen-bearing imino group, said recurring amidine groups being separated by a chain of at least four linear atoms in organic radicals having their valences stemming from carbon which organic radicals are free from groups reactive with amidine salt groups.

3. A pest control composition useful for controlling economically harmful lower forms of life, including bacteria, fungi and insects, containing as an active ingredient a salt of a linear polymeric amidine having as integral chain members recurring bivalent groups consisting of a trivalent nitrogen having one valence attached to a member of the class consisting of hydrogen and alkyl groups of from one to five carbon atoms and a second valence attached to a chain carbon which is in turn attached by a double bond to a hydrogen-bearing imino group, said recurring amidine groups being separated by a hydrocarbon chain of at least four carbon atoms.

4. A pest control composition useful for controlling economically harmful lower forms of life, including bacteria, fungi and insects, containing as an active ingredient a salt of a linear polymeric amidine having as integral chain members recurring bivalent groups consisting of a trivalent nitrogen having one valence attached to a member of the class consisting of hydrogen and alkyl groups of from one to five carbon atoms and a second valence attached to a chain carbon which is in turn attached by a double bond to a hydrogen-bearing imino group, said recurring amidine groups being separated by a polymethylene chain of at least four carbon atoms.

5. A pest control composition useful for controlling economically harmful lower forms of life, including bacteria, fungi and insects, containing as an active ingredient linear polymeric hexamethyleneadipodiamidine dihydrochloride.

6. A pest control composition useful for controlling economically harmful lower forms of life, including bacteria, fungi and insects, containing as an active ingredient linear polymeric decamethylenesebacodiamidine dihydrochloride.

7. A pest control composition useful for controlling economically harmful lower forms of life, including bacteria, fungi, and insects, containing as an active ingredient linear polymeric decamethyleneadipodiamidine dihydrochloride.

JOHN FRANK LONTZ.